United States Patent [19]

Vogel et al.

[11] Patent Number: 5,597,487
[45] Date of Patent: Jan. 28, 1997

[54] WATER PURIFICATION AND DISPENSING SYSTEM

[75] Inventors: Gerald Vogel, Willmar; Joseph Tholen, Walconia, both of Minn.

[73] Assignee: J. Vogel Premium Water Co., Wilmar, Minn.

[21] Appl. No.: 300,638

[22] Filed: Sep. 2, 1994

Related U.S. Application Data

[62] Division of Ser. No. 947,125, Sep. 17, 1992, Pat. No. 5,427,682.

[51] Int. Cl.⁶ .................................................. B01D 61/12
[52] U.S. Cl. .......................... 210/652; 210/259; 210/411; 210/321.69
[58] Field of Search ............................ 210/257.2, 321.69, 210/411, 409, 138, 259, 652

[56] References Cited

U.S. PATENT DOCUMENTS

| | | |
|---|---|---|
| 1,714,075 | 5/1929 | Carvalho . |
| 3,785,492 | 1/1974 | Mazza . |
| 3,786,924 | 1/1974 | Huffman . |
| 3,856,676 | 12/1974 | Grimme, Jr. et al. ................... 210/96 |
| 4,145,291 | 3/1979 | Console et al. . |
| 4,160,727 | 7/1979 | Harris, Jr. . |
| 4,218,317 | 8/1980 | Kirschmann ................... 210/321.69 X |
| 4,359,073 | 11/1982 | de Stoutz . |
| 4,597,509 | 7/1986 | Pereira . |
| 4,801,375 | 1/1989 | Padilla ..................... 210/100 |
| 4,885,081 | 12/1989 | Oliver . |
| 4,928,853 | 5/1990 | Isham et al. . |
| 4,992,282 | 2/1991 | Mehansho et al. . |
| 5,000,661 | 3/1991 | Bloch et al. . |
| 5,034,138 | 7/1991 | Hatanaka et al. . |
| 5,064,097 | 11/1991 | Brog et al. . |
| 5,108,590 | 4/1992 | DiSanto . |
| 5,112,477 | 5/1992 | Hamlin . |
| 5,123,993 | 6/1992 | Wiggins . |

OTHER PUBLICATIONS 22 pages of sales material from Coster Engineering, Mankato, Minnesota, dated from 1989 to 1992, describing several water purification and dispensing systems sold by Coster.

*Information Disclosure Statement*, filed in Patent Application S/N 07/945,125, on Jan. 26, 1993.

*Primary Examiner*—Frank Spear
*Attorney, Agent, or Firm*—Merchant, Gould, Smith, Edell, Welter & Schmidt, P.A.

[57] ABSTRACT

A water purification and dispensing apparatus comprises a water inlet for obtaining water from a supply source and a water purification system with filters for removing impurities from the source water to produce purified water. The water purification system is designed to respond to a demand condition for purified water by recirculating purified water in the apparatus to flush the filters of the water purification system. The apparatus also includes a mineralization system and has a dispensing system for dispensing the mineralized purified water into containers.

12 Claims, 8 Drawing Sheets

WATER PURIFICATION AND DISPENSING SYSTEM

CROSS REFERENCE TO RELATED APPLICATIONS

This application is a divisional of U.S. application, Ser. No. 07/947,125, filed Sep. 17, 1992, now U.S. Pat. No. 5,427,682, which application is incorporated herein by reference.

BACKGROUND OF THE INVENTION

The present invention relates to water purification and dispensing systems and processes for purifying and dispensing water.

Consumers are becoming more aware of the deterioration of the quality of the water supplies from their city, rural water system or private well system. Many retailers currently sell bottled water and other beverage products in off-the-shelf containers. Some retailers use point of purchase dispensers that purify water and dispense it into a container provided by the consumer. Other people have bottled water delivered to their homes or business, often in 5 gallon containers designed to fit on a water cooler. The market for these forms of bottled water is emerging to the point where purified water is a basic commodity.

One problem with any of these sources of bottled water is product quality. Presently there is a concern that bottled water may not be all that much better than tap water. On top of this, the various distribution systems have drawbacks.

Where bottled water is sold off the shelf, there are costs involved in transporting the water from the bottled water plant, through the wholesale and retail distribution system, storing the water at warehouses and in the back room at retailers, and stocking shelves, not to mention the shelf space taken up by the product. Also, the time between when the water is produced and bottled and when the consumer purchases it may be a period of weeks and even months. Of course, leaking bottles also cause a problem, such as when a pallet of cases of bottled water are stacked in a warehouse or the back room of a store.

Delivered bottle water is generally more expensive because of the delivery costs, and is also subject to some of the disadvantages described above. In addition, the delivery process itself has disadvantages, such as the scheduling of delivery times and the possibility that delivery personnel or equipment will track in mud or dirt into the office or other place of use.

One problem of water quality is of course when the purification is not complete. However, if all impurities are removed from the water, it may have a reduced pH that then causes the water to leach minerals or other harmful components from processing equipment, storage containers, and even the body when the water is consumed. It is a common experience to open a container of bottled water and find that is has acquired an off taste, especially when stored in some plastic containers.

Point of sale dispensing of water overcomes some of the drawbacks of other bottled water distribution systems, but also presents new problems. First, because the dispensing equipment is used by the public, it is subject to contamination. Also, even if the water is purified, there is no control over the cleanliness of the container into which it is dispensed. Often, to reduce costs, many water purification and dispensing systems have a small processing capacity coupled with a storage tank. Thus, water is purified on a slow, continuous basis, but is stored to meet demand. These large storage systems present long holding times that are not conducive to water purity, and if the tanks are not sealed, to the possibility of contamination.

With these various drawbacks, there is room for considerable improvement in water purification and dispensing systems and processes.

SUMMARY OF THE INVENTION

In one aspect, the present invention is a water purification and dispensing apparatus comprising a water inlet for obtaining water from a supply source, a water purification system for removing impurities from the source water, a mineral addition system for adding desired minerals into the purified water and a dispensing system for dispensing the mineralized, purified water into containers; wherein the purification, mineral addition and dispensing systems are contained in a single apparatus that can be transported to a location and connected to a water supply source.

In another aspect, the invention is a water purification and dispensing system comprising an inlet for connection to a water supply source, a water purification system for removing impurities from the source water, a dispensing station for dispensing the purified water into containers and a container washing station for washing containers prior to the containers being filled with purified water.

In another aspect, the invention provides a process for purifying, mineralizing and dispensing water comprising the steps of obtaining water from a supply source, purifying the source water by passing it through a reverse osmosis membrane, adding minerals into the purified water and dispensing the purified, mineralized water into a container.

In another aspect, the invention provides a process for purifying and dispensing water comprising the steps of obtaining water from a supply source, purifying the source water by contacting the water with a reverse osmosis membrane to create purified water and concentrate, dividing the concentrate into a waste stream that is discharged and a recirculation stream that mixes with water from the supply source prior to contacting the water with the reverse osmosis membrane, routing the purified water to a water dispensing system until there is no more demand for purified water, and reducing the level of impurities in the mixed water brought into contact with the reverse osmosis membrane before stopping purification and stopping the flow of water contacting the reverse osmosis membrane.

This system allows grocers to reduce the hours necessary to constantly restock empty shelves, it saves on stockroom storage space for bulk or boxed water and reduces investment in inventory of empty water containers.

In addition to overhead cost savings, the invention makes it possible to offer water from this system at a competitive price.

In addition, the grocer can use purified water from the apparatus of the present invention as tributary water for ice machines, floral departments, produce misters, delicatessens and other areas.

The purified water does not contain contaminants such as chlorine, pesticides, lead or other chemicals often found in many municipal water systems. In addition, it is more healthy than many of the purified waters on the market due to the addition of minerals in the preferred process. The water of the preferred process of the present invention is better tasting than most other sources of drinking water. The reusable containers recommended for the system do not leave or alter the taste and odor of the water like many of the containers currently used now, and they can be reused many times, thus reducing the waste going into landfills or over burdened recycling operations and saving the disposal costs.

These and other benefits of the invention, as well as the invention itself, will best be understood in view of the accompanying drawings.

DETAILED DESCRIPTION OF THE DRAWINGS AND PREFERRED EMBODIMENTS OF THE INVENTION

Figure 1:
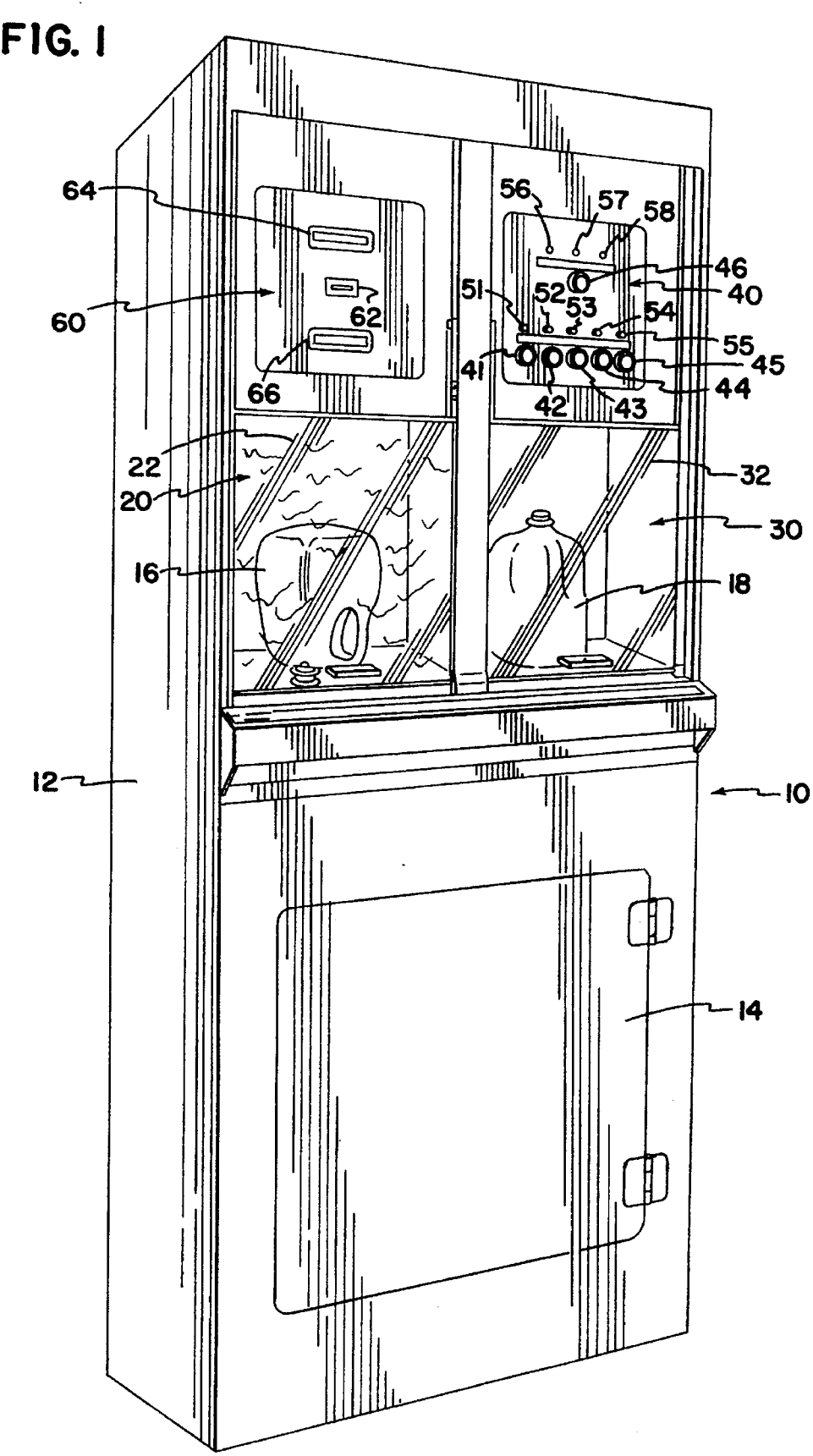
FIG. 1 is a perspective view of the preferred water purification and dispensing apparatus of the present invention.

The various aspects of the invention may all be embodied in one water purification and dispensing apparatus or system, the preferred embodiment of which is shown in FIG. 1. The preferred apparatus 10 comprises a cabinet 12 housing various component parts (not shown) and having an access door 14, a container washing station or compartment 20, a container filling station or compartment 30, a control panel 40 and a display panel 60.

The preferred container washing compartment 20 is positioned behind a transparent door 22. Inside the compartment 20 is a place for positioning a container 16 upside down over a spraying nozzle (not shown). Alternately, a bottle cap wash compartment (not shown), including a nozzle for washing a bottle cap placed therein, may be included in compartment 20. The bottom of compartment 20 is connected to a drain line which leads into a sump inside cabinet 12. In this way, washing and rinse water drains out of the compartment 20. Alternately, the purification system and dispensing station are contained in one apparatus and the washing station is contained in another apparatus located nearby. Also, the container washing station may use water from the water purification system to wash the containers.

Figure 5:
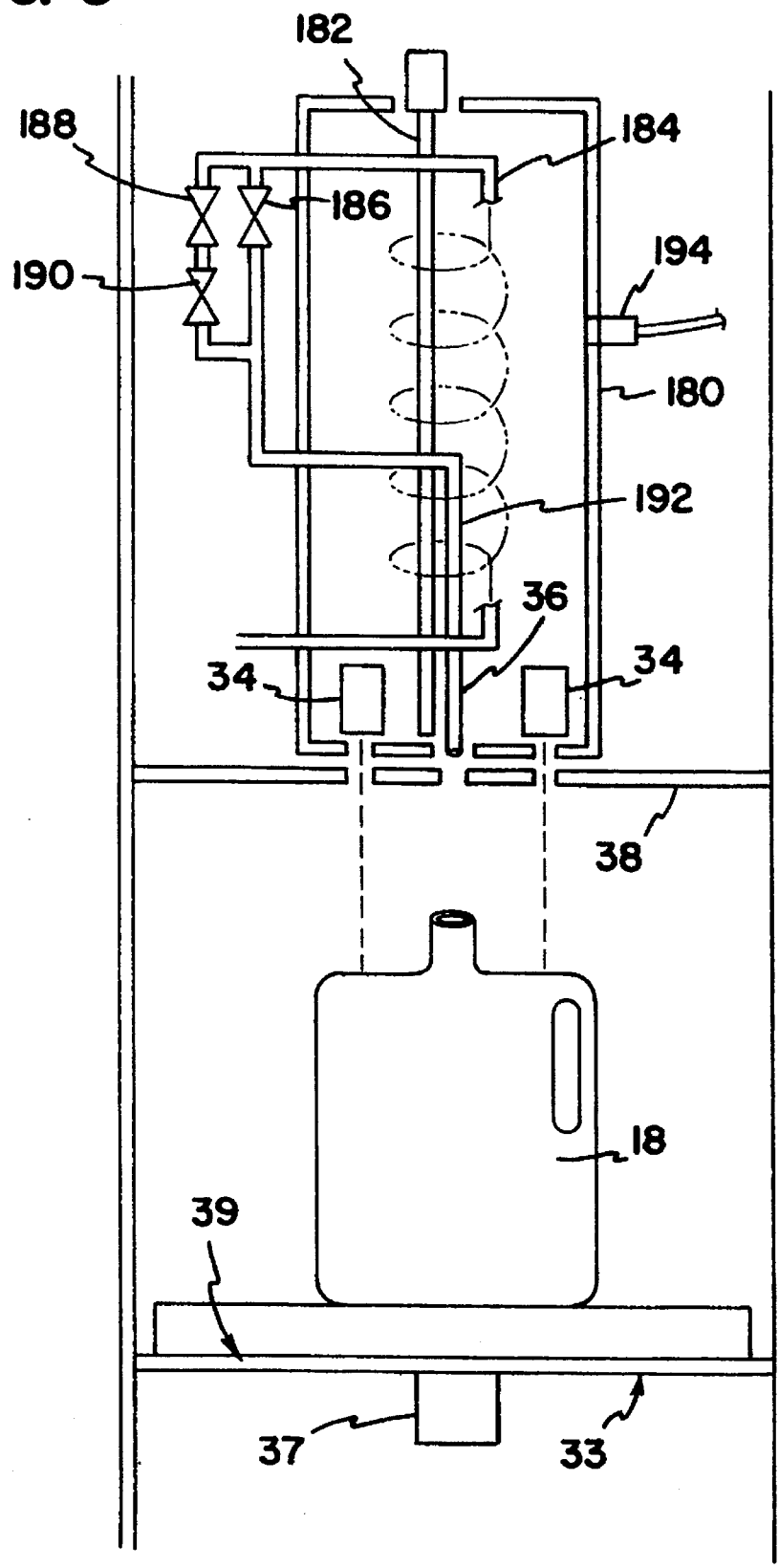
FIG. 5 is a schematic representation of the ultraviolet light treatment module used in the apparatus of FIG. 1.

The container filling station or compartment 30 is also closed by a transparent door 32. As shown in FIG. 5, lasers 34 are used to position the container 18 under a fill spout 36 that is positioned above the top 38 of the compartment 30. Alternately, more than one filling compartment may be used. The top 38 has three small holes through it for passage of the light from lasers 34 and purified water from the fill spout 36. The floor 39 of compartment 30 is connected to a drain line 37 which also empties into the sump inside cabinet 12. The container 18 rests on a stainless steel grid 33 positioned atop the floor 39.

The preferred control panel 40 includes six push buttons 41–46 and eight lights 51–58. Button 41 is a "stop" button, preferably colored red, which can be pushed by a customer anytime it is desired to shut off the operation of apparatus 10. Buttons 42, 43 and 44 are labeled as "1 Gal.", "2 Gal." and "3 Gal." respectively. One of buttons 42, 43 and 44 is pushed to dispense the desired amount of purified water, depending on the size of container 18. Preferably, the container 18 is a polycarbonate container designed for use in water coolers. Button 45 is a "top off" button, used to dispense purified water for as long as button 45 is activated. Button 46 is a "wash/rinse" button for activating the wash cycle of the apparatus 10, described below.

Display panel 60 includes a counter 62 and top and bottom LED displays 64 and 66. These are used to monitor the operation of the apparatus 10. Counter 62 shows how much purified water has been dispensed and displays 64 and 66 are used for diagnostic purposes.

Figure 2:
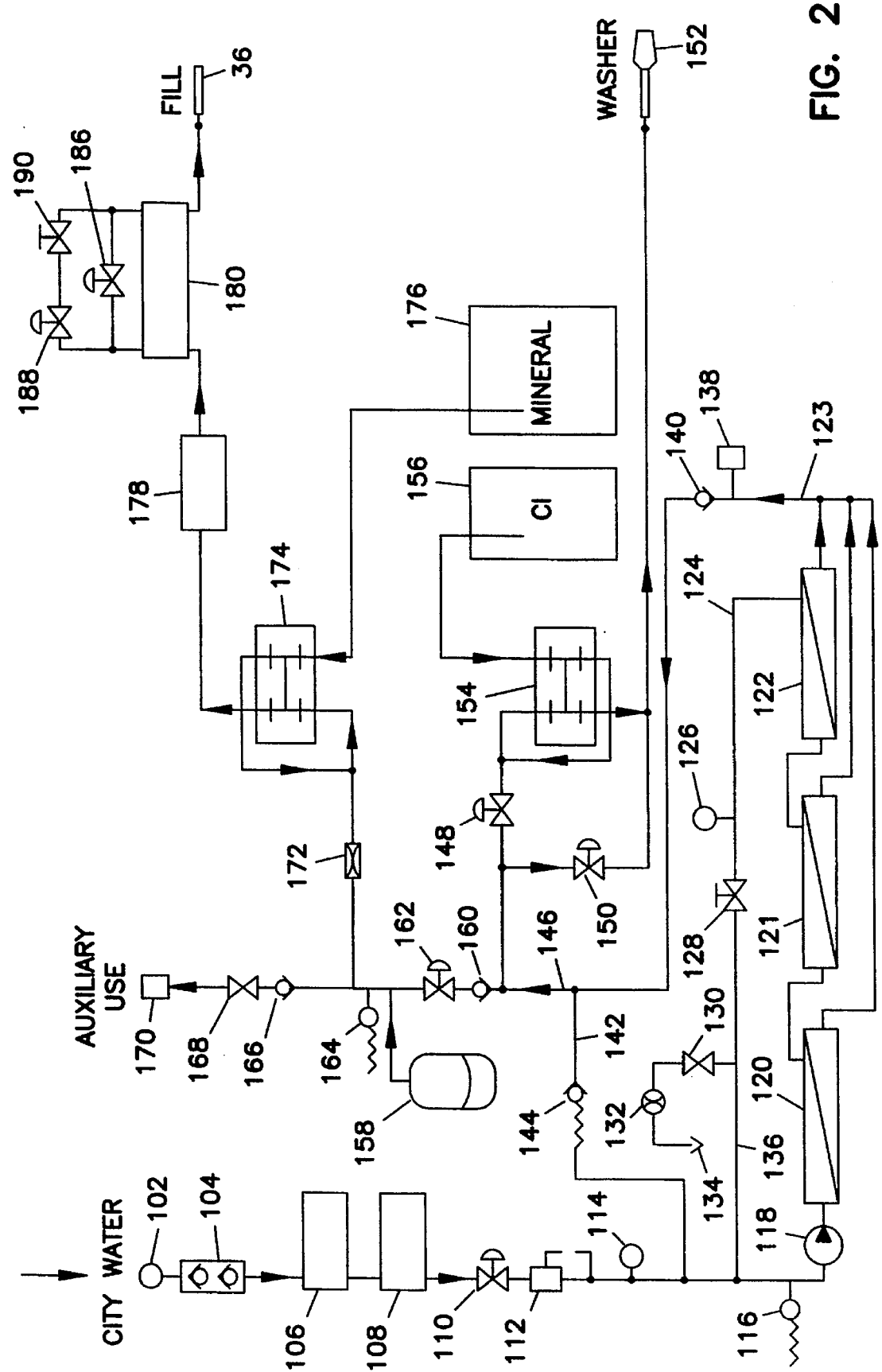
FIG. 2 is a schematic drawing of the water flow components of the apparatus of FIG. 1.

The various internal water flow components of apparatus 10 are depicted schematically in FIG. 2. Water from a supply source, such as city water, enters the system at inlet 102. Preferably, the source water has been treated with a water softener. The water next flows through a back flow preventer 104, then through an activated granulated charcoal filter 106. Next in line is a prefilter 108, preferably sized to remove any particles over three microns. The charcoal filter 106 and prefilter 108 are designed to reduce the amount of purification that has to take place at the reverse osmosis membranes.

Next, the pretreated water flows through a solenoid inlet valve 110. This valve is opened to begin operation of the system. An inlet pressure regulator 112 is used to control the inlet pressure, preferable at 40 psi, so that downstream operations of the system can be consistent (and thus uniform parts can be used in different machines) even though the source water supply pressure may be different at different locations where the apparatus 10 is installed. A pressure gauge 114 and inlet safety pressure switch 116 are positioned after the inlet pressure regulator 112. The inlet pressure safety switch 116 is in the control system for the apparatus 10.

The prefiltered source water is next pressurized by pump 118, preferable to 250 psi, to provide the necessary pressure for the reverse osmosis treatment. Preferably three reverse osmosis units 120, 121 and 122 contained in specialized full flow housings (shown in FIGS. 4A and 4B and described below) are connected in series as shown in FIG. 2. Purified water flows out of a reverse osmosis unit 120, 121 or 122 into line 123. Alternately, a nano-filter or ultra-filter may be used. The concentrate, containing a higher level of impurities, from unit 120 serves as the feed for unit 121. The concentrate of unit 121 is fed into unit 122. The concentrate of unit 122 flows to line 124, past a concentrate pressure gauge 126 and through a concentrate pressure adjust valve 128. The concentrate stream is thereafter divided into a waste stream and a recirculation stream. The waste stream flows through a valve 130, a flow meter 132 and to drain 134. The recirculation stream passes through line 136 and mixes with the water from the supply source. This recirculation of a portion of the concentrate allows the reverse osmosis membranes to be more efficient because it increases the flow rate and hence the velocity of the water in the reverse osmosis units 120, 121 and 122, which prevents the membranes from getting plugged as easily. Alternatively, the concentrate could all be sent to the waste stream and more source water used in a single pass. However, this would substantially decrease the amount of purified water produced compared to the source water used. In many localities, water conservation requirements would prohibit such a waste of water. In a preferred embodiment, valves 110, 128 and 130 are adjusted so that the flow of inlet source water is 3 gallons' per minute, the recirculation stream in line 136 is 1.1 gallons per minute, the waste stream going to drain 134 is 0.8 gallons per minute, producing 2.2 gallons per minute of purified water in line 123.

The purified water in line 123 is measured for resistivity by a conductivity sensor 138. The sensor is set to shut down the system if the output from the reverse osmosis units 120, 121 and 123 has a resistivity less than 20,000 ohms/cm., which correlates to greater than 15 ppm total dissolved solids. The purified water next flows through check valve 140 and past a junction at which the purified water goes either into the dispensing system, if there is a demand for purified water, or through line 142 and check valve 144 to be mixed with source water and recirculation water. Line 142 is used as a quality flush system in two instances, when the purification system starts up and when it shuts down.

At the beginning of a cycle, purified water that has been sitting in the system is recycled through the system, just to assure that dispensed water has the highest possible quality. (However, this purified water may be used in the wash cycle.)

At the end of the demand for purified water, the level of impurities in the mixed source water and recirculation water (which is then feed water to the reverse osmosis unit 120) is reduced before the purification system is stopped. This "flushing" operation improves the life of the reverse osmosis membrane because the impurity level in the water left in contact with the membrane is minimized when the flow of water contacting the membrane has been stopped. Alternately, a separate valve for flushing concentrate from the system may be used. This is achieved by continuing to discharge waste water at the same rate, but substantially cutting down on the flow of source water and making it up with a flow of purified water. For example, the inlet flow rate may be reduced from 3 gallons per minute to 0.8 gallons per minute when the 2.2 gallon per minute purified water starts flowing through line 142 rather than into the dispensing system. After a time, the level of impurities in the feed water to the reverse osmosis unit 120 will approach that of the source water.

During normal operation, when purified water is being supplied to the dispensing system, the concentrate will have a level of impurities preferably of at least 2,000 ppm. and more preferably at least 3,000 ppm. However, by the time the flow of water contacting the reverse osmosis units 120, 121 and 122 is stopped, the level of impurities in the concentrate is preferably no more than 1,500 ppm, and more preferably less than 1,000 ppm.

In the preferred embodiment, the dispensing portion of the system comprises a wash and rinse section, a storage section, an auxiliary feed section, a mineralization section and an ultraviolet radiation/fill section. When the wash cycle button 46 is activated, purified water entering the dispensing portion of the system through line 146 will go first through solenoid wash valve 148 or later through solenoid rinse valve 150, before going to spray nozzle 152 located in the bottom of wash compartment 20. Purified water going through wash valve 148 also goes through proportional feed pump 154, which injects a washing and sanitizing solution from a storage reservoir 156 into the wash water. The washing and sanitizing cycle is used to wash the bottle. Additionally, this cycle may be used to wash the bottle cap.

The washing and sanitizing solution may be a chlorine solution, though any chlorine odors emanating from the apparatus 10 may give customers a wrong impression about the purity of water being dispensed. A preferred washing and sanitizing solution is Roccal II sanitizing and deodorizing agent from National Laboratories, mixed at a ratio of one ounce of agent in one gallon of wash water. Of course, the proportional feed pump 154 may be adjusted to inject any desired ratio of washing and sanitizing agent into the wash water.

If there is a demand for purified water, either to fill the storage tank 158, for filling a container, or for auxiliary use, back flow check valve 160 and solenoid control valve 162 will open. The storage tank 158 is preferably a bladder tank, also known as a hydropneumatic tank. When the internal pressure of the air on one side of the bladder is below the pressure in the line connected to the tank, such as when there is no other demand for purified water, purified water will flow into the tank. When that pressure drops, such as when a container is being filled, purified water will flow out of the tank.

A supply demand pressure switch 164 after the bladder tank 158 senses when the pressure in the tank is so low that additional water needs to be purified.

Purified water may be supplied to auxiliary uses through check valve 166 and auxiliary supply valve 168. Where the apparatus 10 is located in a grocery store, purified water may be supplied for such other store functions as misting of vegetables, ice making equipment, coffee machines, soft drink dispensing machines and the like. Preferably a meter 170 will be attached to the auxiliary line to measure such other uses of purified water so that the level of use can be monitored for reasons such as payment for equipment usage.

Before purified water enters the mineralization portion of the system, it preferably passes through a flow restrictor 172. The flow restrictor can be set to a fixed limit, such as 3 gallons per minute, so that microprocessor controls in the fill section can be time-based and yield a consistent volume of dispensed water.

Next, the purified water passes through a proportional feed pump 174 so that a set ratio of minerals may be injected into the purified water. The minerals added are preferably calcium chloride, potassium chloride and magnesium chloride, preferably at a weight ratio of 60:20:20. Preferably, the minerals are injected at a level so as to bring the level of total dissolved solids in the mineralized water up to 100 ppm. These minerals not only make the water taste better, but they also make it more healthful for drinking. They also bring the pH of the purified water up to a point where it will not leach minerals or resins from the system or containers. Other minerals may be added or substituted depending on the desired qualities of the dispensed water. Also flavors or carbon dioxide could be added.

Preferably, the mineralized water flows next through a block cartridge carbon filter 178. The filter 178 provides a good mixing action to totally dispense the minerals, as well as polishing the water by removing any dissolved carbon dioxide in the water.

The last portion of the water system is a fill system with an ultraviolet lamp to destroy any bacteria, shown in FIG. 5. Water enters a housing 180 containing an ultraviolet lamp 182. The housing 180 may be constructed of polypropylene with a mirrored finish interior to reflect UV light back to the tubing 184 carrying the water. Preferably, the tubing is a thin wall, PFA Teflon tubing shaped into a helix. Fifteen feet or more of tubing 184 may be formed into a suitable sized helix, which provides for a fairly long residence time for exposing the water to UV light.

Next, the water passes out of the housing and through a set of solenoid fill valves connected in parallel, a fast fill valve 186 and a slow fill valve, or top off valve 180, paired with a needle valve top off throttle 190. Alternately, a fixed orifice may be used instead of the needle valve 190. The top off valve 188 is used to prevent the water from draining from the fill tube 36 at the end of the cycle. Finally, the water flows back into housing 180 and passes through another section of tubing 192, where it is further exposed to UV light, and out of fill tube 36, discussed previously. This second pass of the water past the UV light, and the UV light shining on the fill tube 36, assures that no airborne bacteria are able to contaminate either water in the fill tube 36 or the fill valves 186 and 188. The fill tube 36 is raised above the top 38 to prevent people from touching and thereby contaminating, the fill tube 36. Alternately, a shield guard (not shown) may be used to prevent access to the fill tube 36.

A photo resist sensor 194 is mounted by a port in housing 180 to detect if the UV light 182 should shut off or otherwise not provide the necessary intensity. The output of this sensor and the other sensors in apparatus 10, as well as the push buttons 41–46, are preferably fed as inputs into a microprocessor, which then controls the various solenoid valves. This control operation of the apparatus 10 can best be understood in view of FIGS. 3A–3F, which provide a schematic representation of the computer program used to control the microprocessor.

Figure 3A:
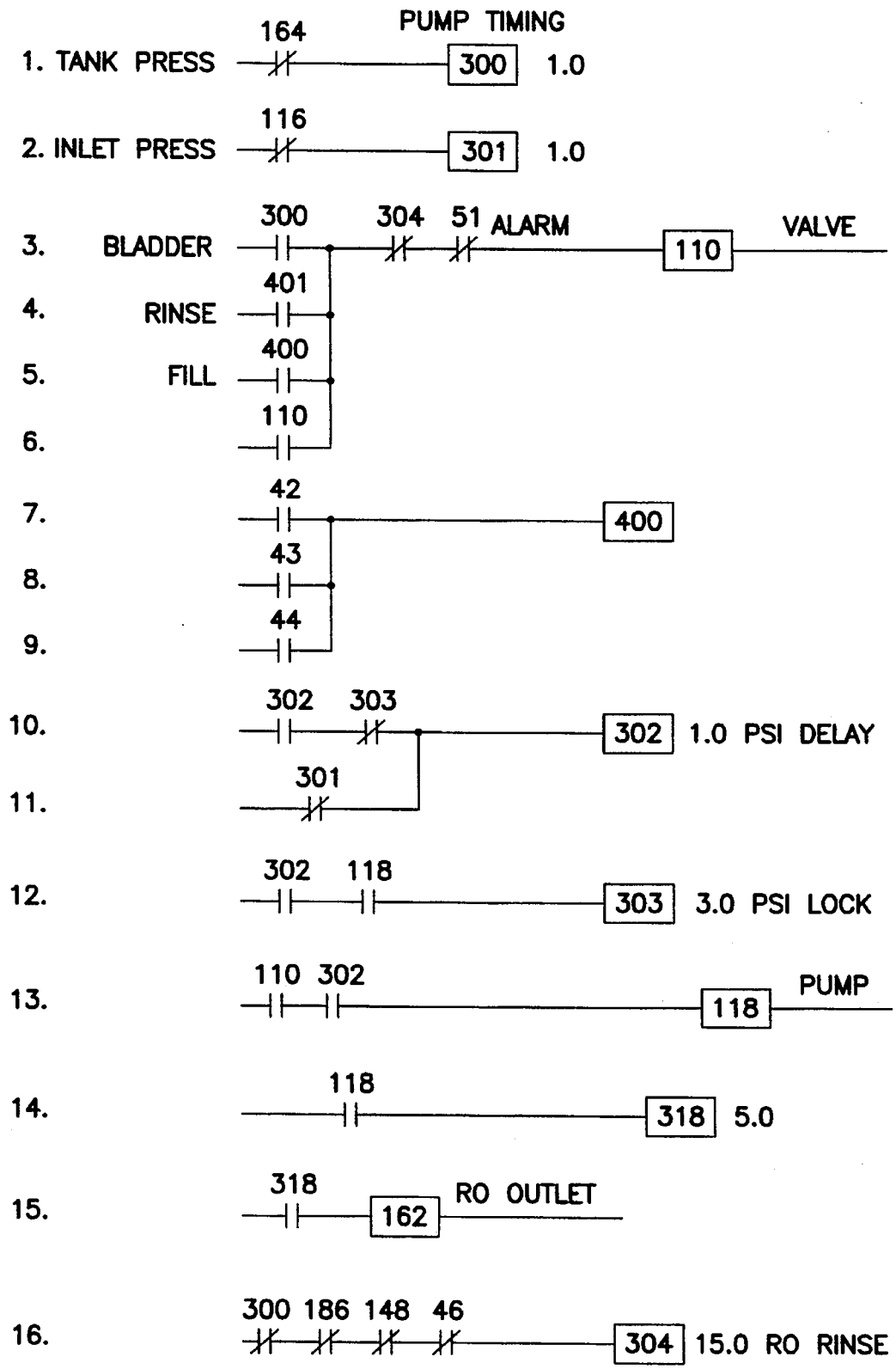
FIGS. 3A–3F are schematic representations of the control program used by a microprocessor to control the apparatus of FIG. 1.
Figure 3B:
Figure 3B:
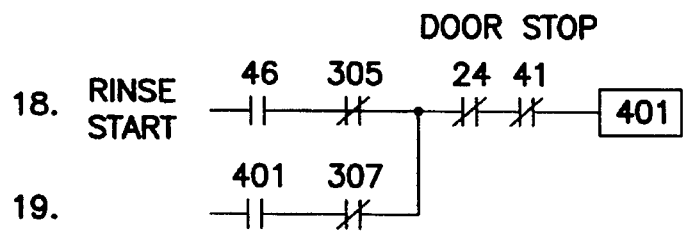
Figure 3B:
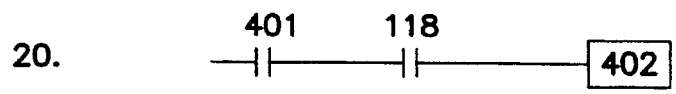
Figure 3B:
Figure 3B:
Figure 3B:
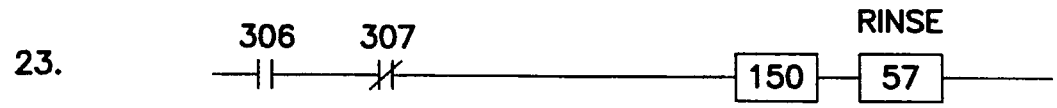
Figure 3B:
Figure 3B:
Figure 3C:
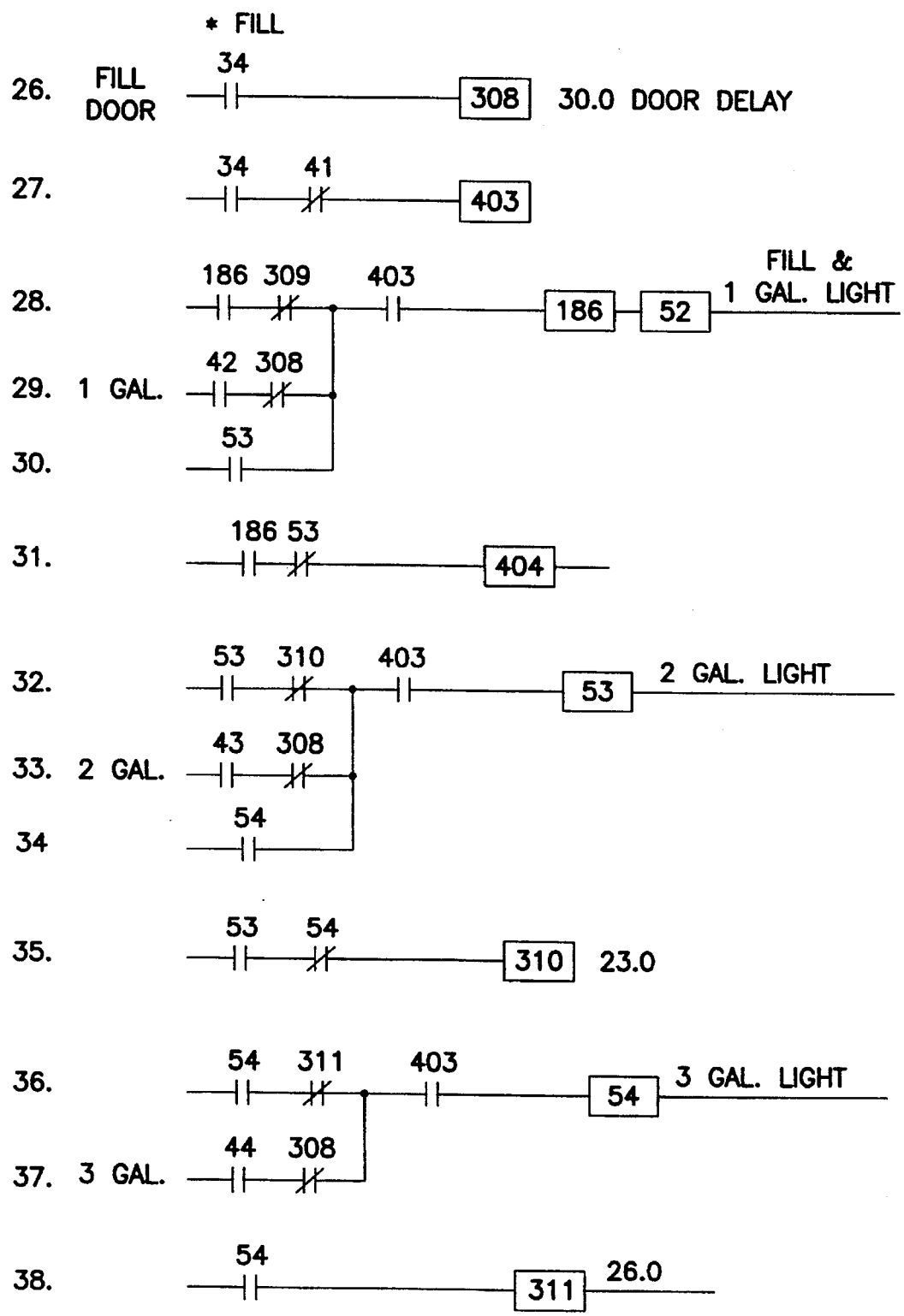
Figure 3D:
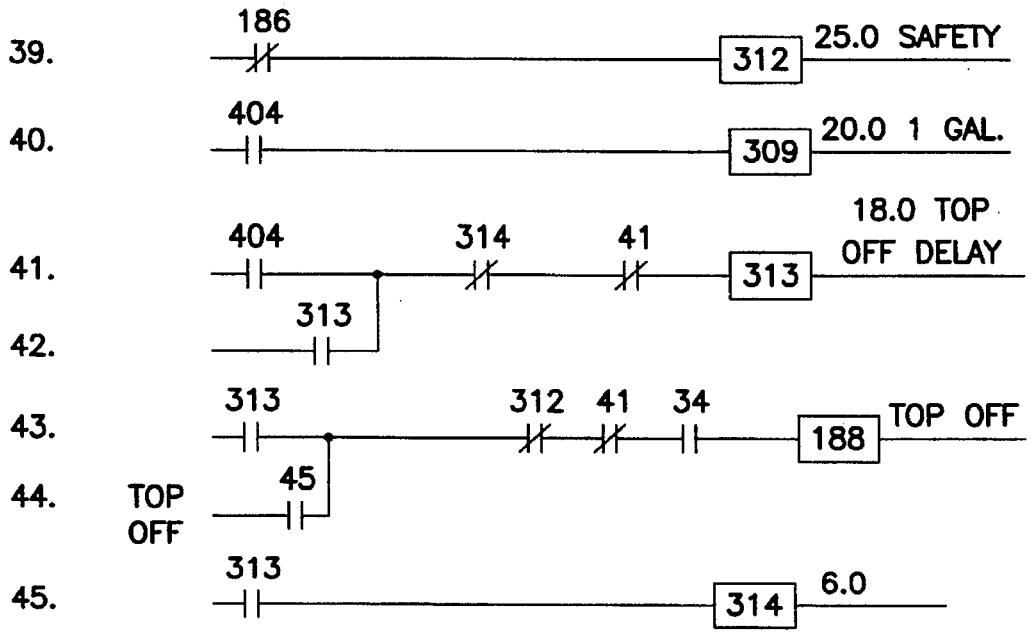
Figure 3E:
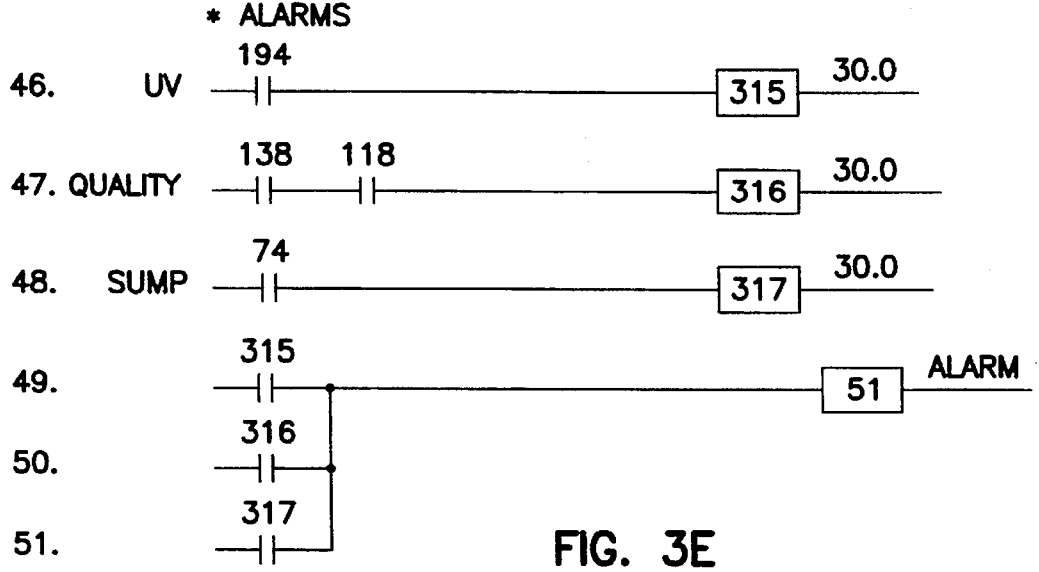
Figure 3F:
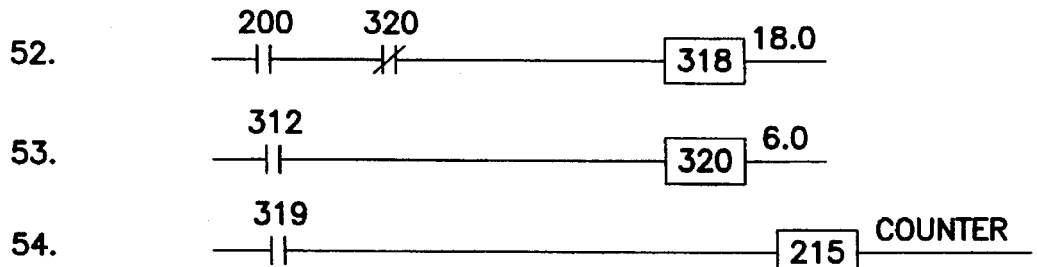

The control system of the apparatus 10 is schematically portrayed in FIGS. 3A–3F. FIG. 3A shows the control conditions necessary for pump operation. FIG. 3B shows the control conditions for operation of the wash and rinse system. FIG. 3C shows the control of the fill operation. FIG. 3D shows the control of the top off valve. FIG. 3E shows the control of the alarm signals and FIG. 3F shows the control of the counter 62.

There are numerous inputs into the microprocessor from the components of the system. These inputs have been labeled with the system component reference numbers. For example, line 1 of FIG. 3A has an input from the supply demand pressure switch 164. Some of the switches are normally closed, as is switch 164, and others are normally open, as are push buttons 42, 43 and 44 (lines 7–9). These normal conditions are depicted in the schematic.

Others of the inputs are based on the position of the various valves and the pump 118. Again, these inputs are labeled with the reference number used to depict those parts in FIGS. 1, 2 and 5.

There are three inputs from the apparatus 10 for which the component parts are not shown in FIGS. 1 and 2. There is a wash/rinse compartment door switch 24 (line 17), a fill compartment door switch 34 (line 26) and a sump overflow prevention switch 74 (line 48). (The sump has another float and a separate pump that will empty the sump whenever it reaches capacity. The sump overflow prevention switch 74 is set to trigger an alarm when the sump level goes above the normal point at which the sump is intended to empty).

The microprocessor has numerous timers, numbered 300, 301, 302 etc. that are used for various control and delay sequences. These timers provide inputs to other microprocessor features, and the timers are thus represented in FIGS. 3A–3F in boxes when they are being set, and with the same reference numbers without a box when they are used as an input elsewhere. The preferred set time (in seconds) for the timers are indicated to the left of the boxes where the timers are shown being set. Whenever a break occurs in the circuit to the timer, the timer will be reset.

Several of the components, such as the valves and the pump 118, are activated by the microprocessor. The reference number for that component is then shown in a box, which represents a hard wired output. For example, line 3 shows the control conditions necessary to open valve 110. On the other hand, the ultraviolet light 182 is on whenever the apparatus is plugged in.

The microprocessor also includes internal relays, numbered 400, 401 etc. These relays are used elsewhere for controlling other functions. Again, where the relay reference number is in a box, that line shows the condition for activating the relay, and where the reference number is not included in a box, it is used as a control condition.

Figure 4A:
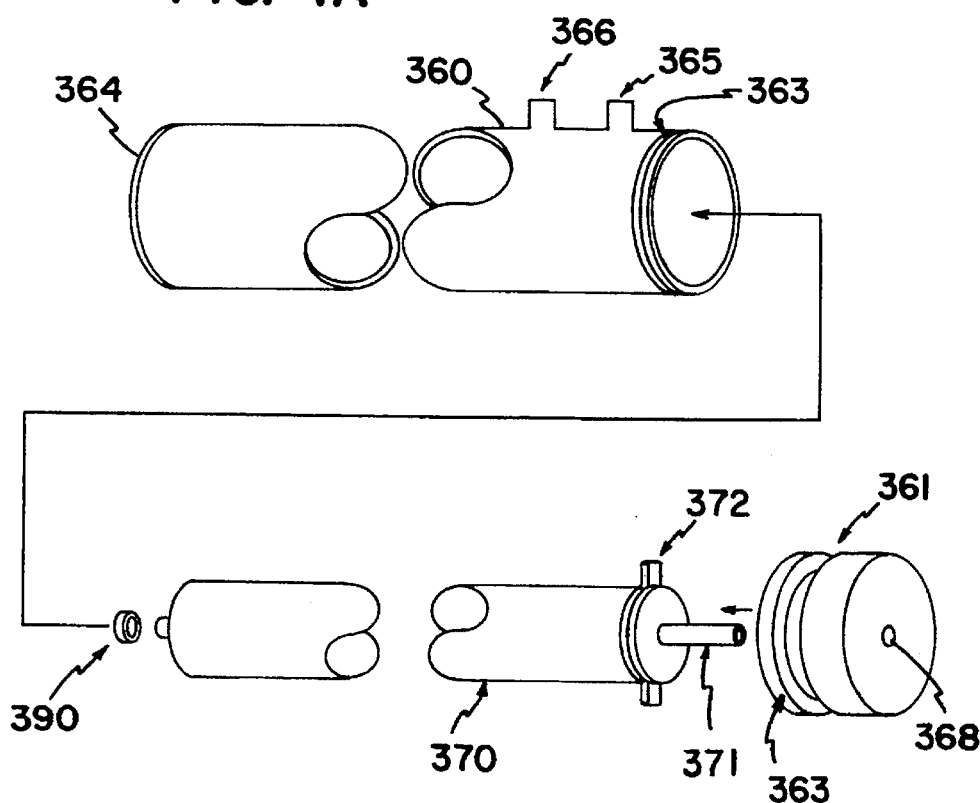
FIG. 4A is an exploded view of a preferred reverse osmosis unit used in the apparatus of FIG. 1.
Figure 4B:
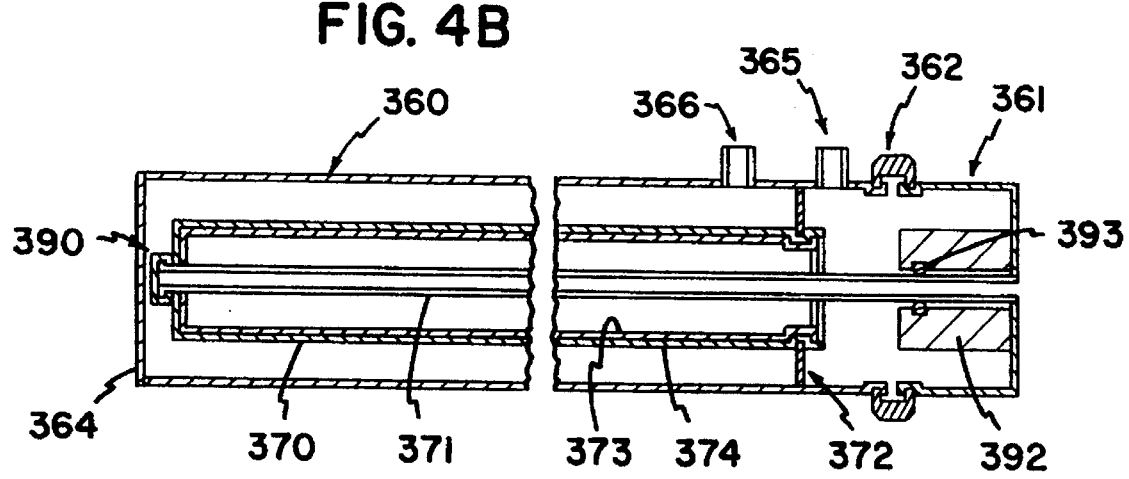
FIG. 4B is a cross-sectional view of the reverse osmosis unit shown in FIG. 4A.

The reverse osmosis membranes are preferably housed in a "full flow" housing as shown in FIGS. 4A–4B. The housing has a body 360 and a cap 361, held together by a Victaylic clamp 362. Hence the body and cap each have Victaylic grooves 363 near their ends. The body 360 is otherwise cylindrical, with a plate 364 welded to the bottom to close the bottom end. Near the top of body 360 are two female nipples 365 and 366, used to provide respectively an inlet and outlet to the body 360. The cap 361 is used to seal the top of body 360, though the cap 361 has an outlet hole 368 through the center of its top. A gasket (not shown) seals the cap 361 to the body 360.

Inside the housing is a standard reverse osmosis membrane unit 370. The unit 370 has a pipe 371 going through its center into which the purified water enters. In use, the pipe 371 is plugged at the bottom end with a cap 390. An O-ring within the cap seals the pipe 371 and cap 390 connection. The top end of pipe 371 extends through a coupling 392 positioned in the cap 361 and through hole 368 in cap 361, and is attached to line 123 of FIG. 2. The coupling 392 includes an O-ring 393 for sealing purposes. The unit 370 also includes a U-cup brine seal 372, which is sized to seal off the inside of body 360 between inlet nipple 365 and outlet nipple 366. The reverse osmosis membrane 373 is actually encased in a fiberglass outer wrapper 374. Water entering the reverse osmosis unit 120 thus flows in through an inlet nipple 365, down through the reverse osmosis membrane 373 and is deflected by end plate 364 so that it travels back up along the inside wall of body 360, but outside of the fiberglass outer wrap 374, where it then exits through outlet nipple 366 and is routed to the next reverse osmosis unit 121. Each of units 120, 121 and 122 are preferably constructed using the full flow housing of FIGS. 4A–4B.

The preferred microprocessor is a Micro-1 programmable controller from Idec Corporation, 1213 Elko Drive, Sunnyvale, Calif. The counter 62 is preferably an Omron counter model H7EC-B from Omron Electronics, Inc., One East Commercial Drive, Schaumburg, Ill. The preferred reverse osmosis membrane units 370 are BW30-4040 reverse osmosis elements from Filmtec, 7200 Ohms Lane, Minneapolis, Minn. The preferred Teflon tubing 184 has a 0.25 inch O.D. and is number AT250-030 from Fluoroware, Inc., 102 Jonathan Boulevard North, Chaska, Minn. The preferred lasers are No. LM-2U manufactured by Applied Laser Systems. The carbon block filter 178 may be a model CBC-BBS filter from Ametek, Plymouth Products Division, 502 ; Indiana Avenue, Sheboygan, Wis. The pump 118 is preferable a one horsepower pump. The bladder tank 158 is preferably a 3-gallon bladder tank.

The preferred embodiment of the present invention has many advantages. It is a completely self contained system. There is no remote equipment, controls or storage vessels present that may be adjusted inadvertently or become contaminated. The apparatus has an automatic shut-off for either low inlet pressure or high conductivity in the purified water. Also, "Out of Service" lights come on if an automatic shut-off condition occurs. The counter 62 is preferably equipped with auxiliary battery power backup. The microprocessor preferably includes a memory protected against power failure. The 30 second timer on the dispensing door allows complete operation of all dispensing controls. After 30 seconds, however, the door must be opened and closed again to reset the 30 second control timer (See Line 26 of FIG. 3*c*). The 30 second timer on the wash/rinse door allows complete operation of wash/rinse control. After 30 seconds, the door must be opened and closed again to reset 30 second control timer (See Line 17 of FIG. 3*b*).

The use of a fast-fill valve 186 and a slow fill valve 188 allows fast filling of container 18 until near the point at which the container 18 is full. The slow rate of filling at the end prevents splashing and, more importantly, slows down the flow of water through fill-tube 36 so that when slow fill valve 188 closes, the water does not all run out of fill tube 36. The water remaining in fill-tube 36 prevents air and airborne contaminants from traveling up tube 192 and contaminating valves 186 and 188.

The invention is designed for use at retail outlets where customers fill their containers and pay for the purified water as they go through a check-out line. Other places where the invention may be used include convenience stores, office complexes, multi-family dwellings, industrial plants, day care programs and educational facilities.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A water purification and dispensing apparatus for filling a container, comprising:

a water inlet for obtaining unpurified water from a supply source;

a water purification system including means for filtering the unpurified water to obtain purified water;

a water outlet which directs the purified water to the container;

means for controlling said water purification system including means for selectively providing a demand condition for the purified water, said system including means for directing the purified water to said water outlet after said providing means provides said demand condition; and means for recycling purified water in said water purification system, said recycling means including means for bypassing said water outlet, said bypassing means having first means for flushing said filtering means with the purified water, said recycling means being responsive to said providing means after said providing means provides said demand condition and before said directing means directs the purified water to said water outlet.

2. The apparatus in accordance with claim 1 wherein said bypassing means further has second means for flushing said filtering means with the purified water after said providing means ends said demand condition.

3. The apparatus in accordance with claim 1 wherein said filtering means includes a reverse osmosis element which outputs a purified water stream and a concentrate stream and wherein said system further includes means for dividing said concentrate stream into a waste stream and a recirculation stream, the recirculation stream being directed by said system through said reverse osmosis element again.

4. The apparatus in accordance with claim 1 wherein said system includes means for regulating pressure of the unpurified water to a first predetermined value and means for increasing the pressure to a second predetermined value before the unpurified water passes through said filtering means.

5. The apparatus in accordance with claim 1 wherein said water outlet includes a downwardly-directed fill tube, said controlling means including means for fast filling said container and means for slow filling said container, said fill tube having an internal diameter such that said fill tube retains purified water therein when said slow filling means is turned off.

6. The apparatus in accordance with claim 5 including a compartment for receiving the container, said compartment having a top with first, second, and third openings, said fill tube ending above said second opening so that said fill tube is protected by said top from users touching said fill tube, said apparatus further including a pair of light sources, said light sources directing light through said first and third openings, said first and third openings being equally spaced on opposite sides of said second opening so that an upper opening in said container can be centered between said first and third light sources in order to receive purified water flowing through said second opening.

7. The apparatus in accordance with claim 1 wherein said water purification system includes a mineral addition system for adding minerals to the purified water and means for restricting flow to a predetermined rate so that a known flow rate of purified water is received by said mineral addition system.

8. The apparatus in accordance with claim 7 wherein said mineral addition system adds calcium chloride, potassium chloride and magnesium chloride to the purified water at an approximate weight ration of 60:20:20 up to a total dissolved solids level of approximately 100 ppm.

9. The apparatus in accordance with claim 8 wherein said water purification system includes downstream from said mineral addition system means for mixing said mineralized, purified water.

10. The apparatus in accordance with claim 1 wherein water purification system includes a tubular helix upstream from said water outlet and an ultraviolet light source located to direct ultraviolet light through the purified water in said helix before the purified water flows through said water outlet, said helix providing a relatively long residence time for the purified water to be exposed to the ultraviolet light, the ultraviolet light functioning to destroy bacteria.

11. A process for purifying and dispensing water comprising the steps of:

obtaining unpurified water from a supply source;

providing a demand condition for purified water;

filtering the unpurified water through filtering means to obtain purified water, said filtering means including a reverse osmosis element which creates the purified water and a concentrate;

on receiving the demand condition, recycling purified water from the filtering means by recirculating the purified water from the filtering means back through the filtering means to flush said filtering means;

following said recycling step, directing the purified water to a water dispensing arrangement; and subsequent to demand no longer being present, stopping water flow.

12. The process of claim 11 wherein the water flow stopping step subsequent to demand no longer being present and prior to actually stopping water flow, includes the step of recirculating purified water from the filtering means back through the filtering means to flush the filtering means.

* * * * *